US011170422B2

(12) United States Patent
Naficy et al.

(10) Patent No.: US 11,170,422 B2
(45) Date of Patent: *Nov. 9, 2021

(54) VENDOR WEBSITE GUI FOR MARKETING GREETING CARDS AND ENVELOPES

(71) Applicant: Minted LLC, San Francisco, CA (US)

(72) Inventors: Mariam B. Naficy, San Francisco, CA (US); Tonia Misvaer, Muir Beach, CA (US); Sean McLucas, Walnut Creek, CA (US); Nathan Glynn, Oakland, CA (US); Erica Meade, Berkley, CA (US); Namrata Patel, San Francisco, CA (US)

(73) Assignee: MINTED LLC, San Francisco, CA (US)

( * ) Notice: Subject to any disclaimer, the term of this patent is extended or adjusted under 35 U.S.C. 154(b) by 652 days.

This patent is subject to a terminal disclaimer.

(21) Appl. No.: 15/982,056

(22) Filed: May 17, 2018

(65) Prior Publication Data

US 2018/0276730 A1  Sep. 27, 2018

Related U.S. Application Data

(63) Continuation of application No. 14/596,417, filed on Jan. 14, 2015, now Pat. No. 10,007,943.

(Continued)

(51) Int. Cl.
*G06Q 30/06* (2012.01)
*G06F 3/0484* (2013.01)

(52) U.S. Cl.
CPC ..... *G06Q 30/0621* (2013.01); *G06F 3/04842* (2013.01); *G06Q 30/0633* (2013.01)

(58) Field of Classification Search
CPC .............. G06Q 30/0601–0643; G06F 3/04842
See application file for complete search history.

(56) References Cited

U.S. PATENT DOCUMENTS

| 6,873,971 | B1 * | 3/2005 | Tackbary | G06Q 30/02 |
| | | | | 705/26.8 |
| 7,734,719 | B2 * | 6/2010 | Friedman | G06Q 30/02 |
| | | | | 709/217 |

(Continued)

OTHER PUBLICATIONS https://www.prweb.com/releases/signature_cards/greeting_cards/prweb10761278.htm (May 23, 2013).*

*Primary Examiner* — Resha Desai
(74) *Attorney, Agent, or Firm* — Jones Day

(57) ABSTRACT

A processor-based system stores different card templates in a database. Each card template has a card feature that can have any color from among a first set of colors. The system also stores, in the database, for each stored card templates, a corresponding envelope template. Each envelope template has an envelope feature that can have any color from among a second set of colors. The system receives a user selection of a card template from among the card templates and a user selection of a color to be applied to the card feature. The system displays the card template, with the card feature having the user-selected color. The system also displays the corresponding envelope template that corresponds, in the database, to the selected card template. The envelope feature is displayed with the user-selected color based on the user-selected color having been selected for the card feature.

8 Claims, 10 Drawing Sheets

Related U.S. Application Data

(60) Provisional application No. 62/089,569, filed on Dec. 9, 2014.

(56) References Cited

U.S. PATENT DOCUMENTS

| | | | | |
|---|---|---|---|---|
| 8,196,038 B2* | 6/2012 | Berger | ............... | G06Q 10/107 |
| | | | | 715/243 |
| 2003/0084008 A1* | 5/2003 | Simpson | ........... | G07B 17/00024 |
| | | | | 705/408 |
| 2008/0294977 A1* | 11/2008 | Friedman | ............... | G07F 17/26 |
| | | | | 715/224 |
| 2010/0138506 A1* | 6/2010 | Van | ............... | G06Q 30/02 |
| | | | | 709/206 |
| 2012/0066613 A1* | 3/2012 | Berger | ............... | G06Q 30/01 |
| | | | | 715/751 |

* cited by examiner

VENDOR WEBSITE GUI FOR MARKETING GREETING CARDS AND ENVELOPES

CROSS REFERENCE TO RELATED APPLICATION

This is a continuation of U.S. patent application Ser. No. 14/596,417, filed on Jan. 14, 2015, which claims priority from U.S. Provisional Application No. 62/089,569, filed Dec. 9, 2014, both of which are incorporated herein by reference.

TECHNICAL FIELD

This relates to a computer-based graphical user interface (GUI) for marketing greeting cards and attendant envelopes to a customer on a website and enabling the customer to select and customize the greeting cards and envelopes.

BACKGROUND

A website of a greeting card vendor provides a graphical user interface (GUI) for marketing greeting cards. A customer uses the GUI to upload a photograph and select a greeting card template. The website combines the photograph with the template to yield a customized greeting card that the customer can purchase. The customer also uploads recipient addresses, selects a card template, selects an envelope template, and selects a font for printing the addresses on the envelope template. The user submits an online request to purchase envelopes that match the selected envelope template and that are imprinted with the uploaded addresses in the user-selected font. Before printing the purchased envelopes, the GUI displays a computer-generated preview of each envelope that will be printed, with each preview showing the respective envelope with a respective one of the uploaded addresses. Each address appears on the previewed envelope as the address will appear on the actual printed envelope.

SUMMARY

A processor-based system stores different card templates in a database. Each card template has a card feature that can have any color from among a first set of colors. The system also stores, in the database, for each stored card templates, a corresponding envelope template. Each envelope template has an envelope feature that can have any color from among a second set of colors. The system receives a user selection of a card template from among the card templates and a user selection of a color to be applied to the card feature. The system displays the card template, with the card feature having the user-selected color. The system also displays the corresponding envelope template that corresponds, in the database, to the selected card template. The envelope feature is displayed with the user-selected color based on the user-selected color having been selected for the card feature. The system then receives a user selection to purchase cards and envelopes that respectively match the selected card template and the selected envelope template.

In different examples, the system receives a user-provided recipient name and a corresponding user-provided recipient address. The displaying of the corresponding envelope template includes displaying, on the corresponding envelope template, an address block that includes the user-provided recipient name and the user-provided recipient address. In different examples, the envelope feature is the displayed recipient name. The recipient address can be displayed on the envelope template with a color that is different than the color that is applied to the displayed recipient name. The card feature can be a background color and the envelope feature can be an address preface. The recipient name can be displayed with a font style that is different than a font style with which the recipient address is displayed. A calligraphic flourish projects from one letter of the displayed recipient name and extends horizontally beyond another letter of the displayed recipient name. The displayed envelope template includes non-text ornamentation. The system prints, on an envelope, both the address block and the non-text ornamentation in one printing step.

DETAILED DESCRIPTION

A graphical user interface (GUI) is used by a user (such as a potential customer), for selecting and customizing greeting cards and envelopes. The GUI displays different greeting cards. The user uses the GUI to select one of the displayed cards and to customize the selected card. The GUI also displays different envelopes for the user to choose from. The displayed envelopes include an envelope that matches the selected card. The user uses the GUI to select one of the displayed envelopes, to customize the envelope, and to preview an image of what the selected-and-customized envelope will look like when imprinted with different user-provided addresses.

Figure 1:
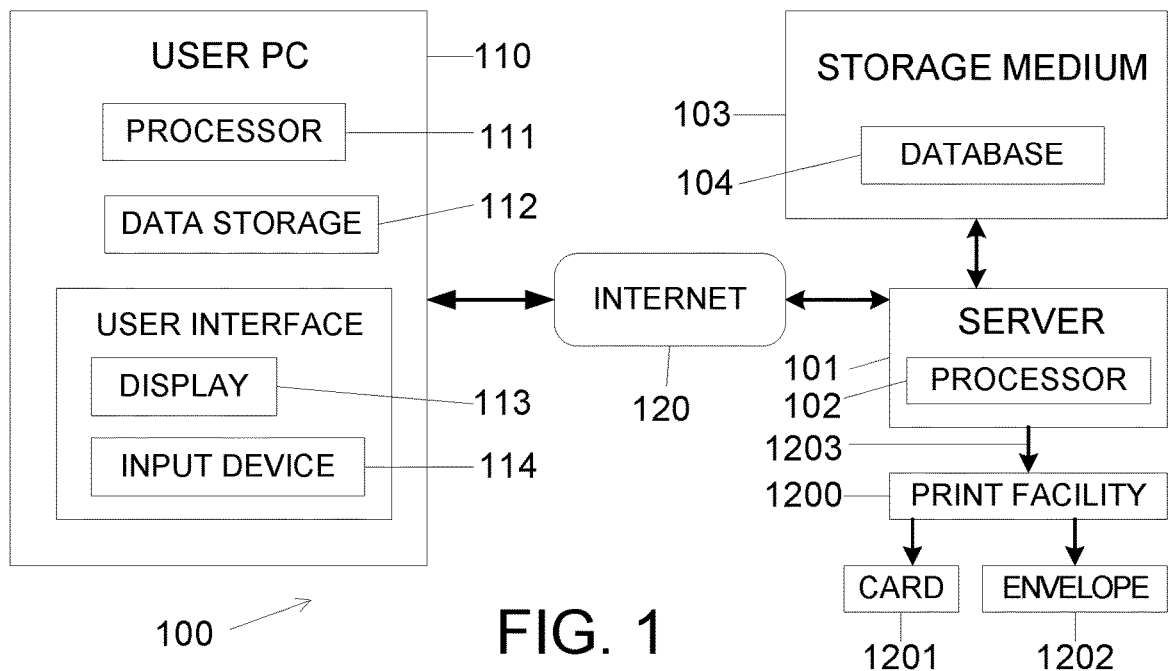
FIG. 1 is a block diagram of an example system for providing a GUI for customizing and selecting greeting cards and envelopes.

FIG. 1 is a block diagram of an example system 100 for implementing the GUI. The system includes a non-transitory hardware server 101 that has a processor 102 (which can represent multiple processors working cooperatively). The processor 102 executes program instructions of software code. The code is stored on a non-transitory hardware computer-readable data storage medium 103, such as a computer hard drive device, to implement the GUI. In this example, the server 101 hosts a website, associated with a greeting card vendor (merchant, manufacturer) of the system 100, that provides the GUI. The storage medium 103 includes a database 104 that stores images and text provided by the user. The database 104 also stores design templates for cards and envelopes, and data relating to each template.

The GUI is provided on a user's computing device 110 (user device). Examples of user devices are a personal computer (PC) and a mobile communication device such as a smart phone. Each user device 110 has a processor 111 for executing software commands and a non-transitory hardware processor-readable data storage medium 112 for storing the commands. Each user device 110 also has a user interface that includes a display screen 113 and a user input device 114 for implementing the GUI. The input device 114 may include a mouse, a keypad and a touch-screen for inputting user entries. The user device 110 may communicate with the server 101 through a communication network such as the Internet 120.

Some or all of the software code for implementing the GUI may be stored in and executed by the server 101. The remainder of the software code for implementing the GUI may be stored in and executed by the user device 110. Alternatively, all of the software code for implementing the GUI may be stored in and executed by the user device 110, such that a server or network connection is unnecessary.

Figure 2:
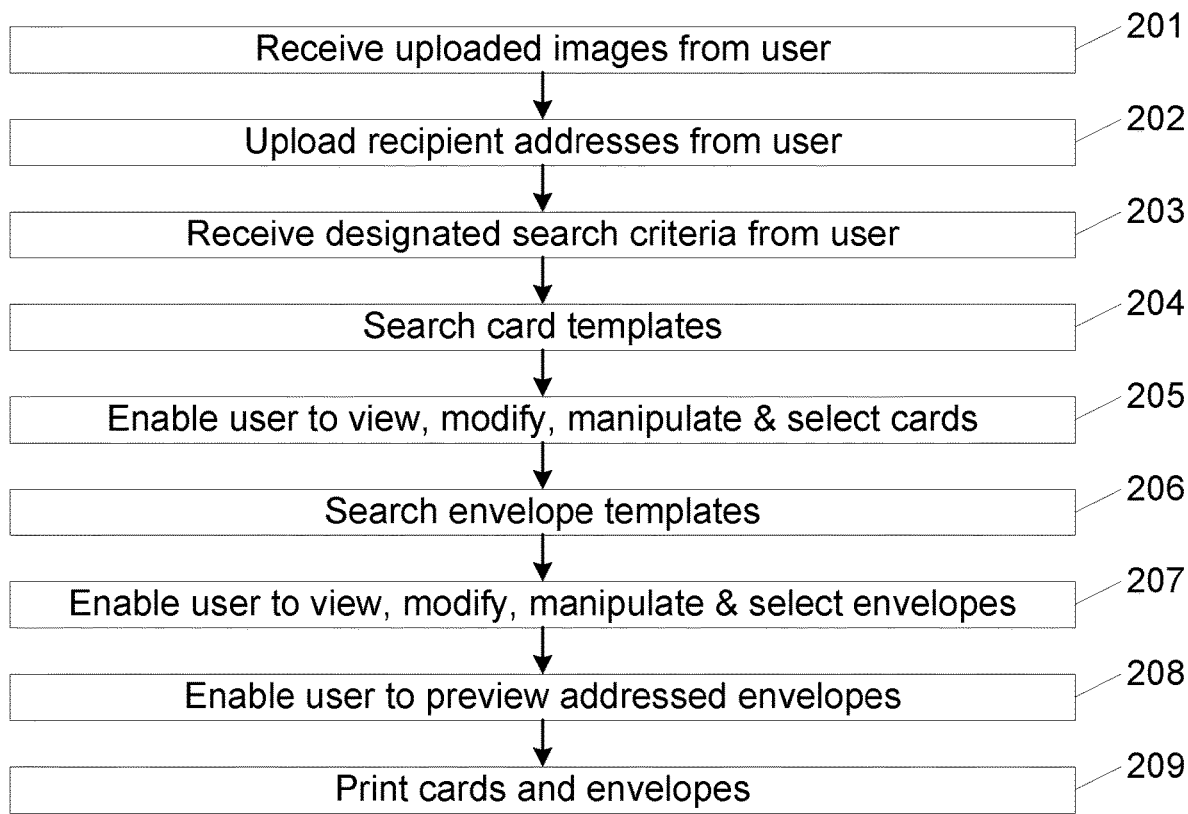
FIG. 2 is a flow chart of a method implemented by the system for implementing the GUI.

FIG. 2 is a flow chart of an example method for implementing the GUI. The method steps are explained below.

Figure 3:
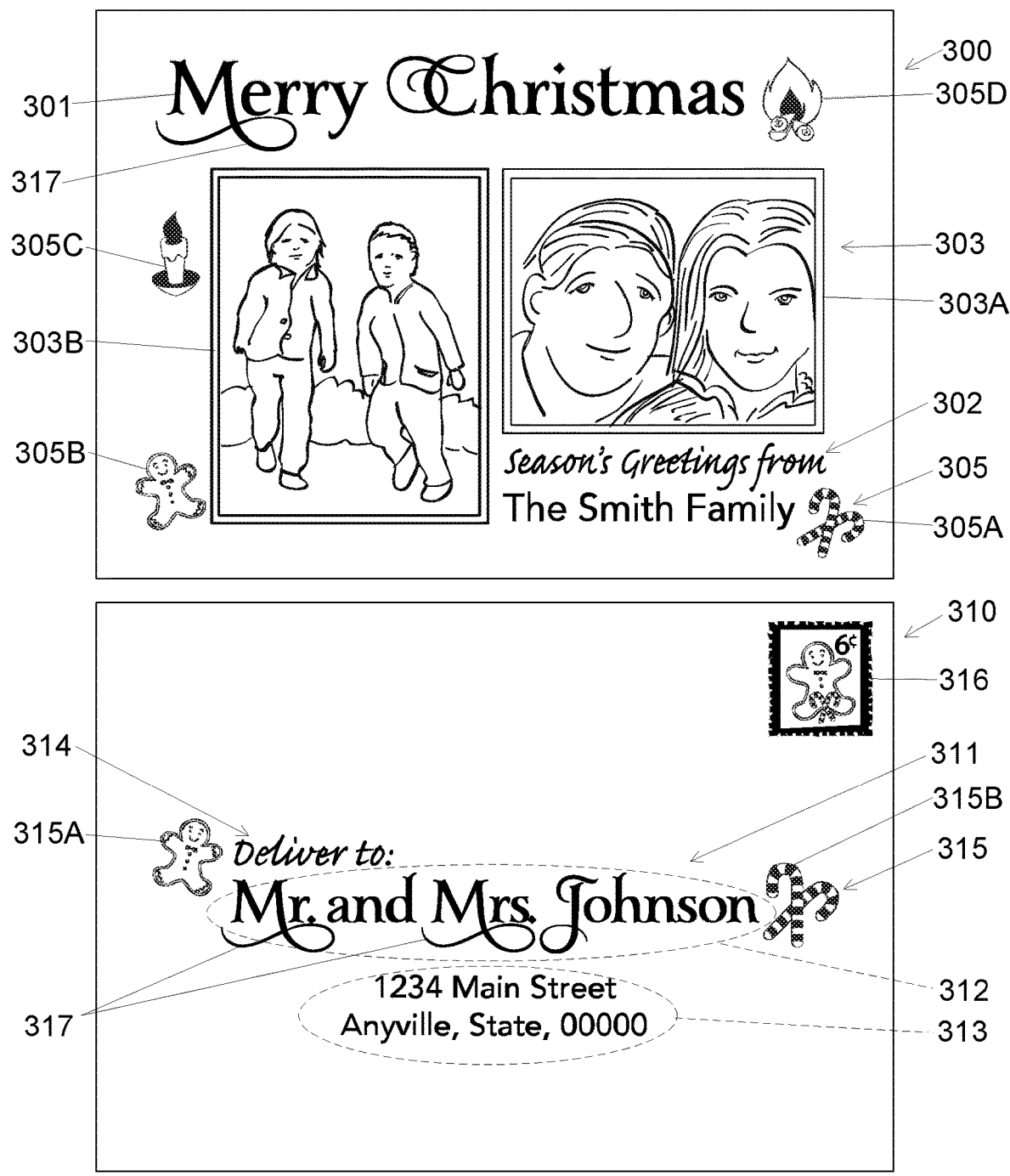
FIG. 3 shows an example card and a corresponding envelope, that are displayed by the GUI.

FIG. 3 shows an example card template 300 and its corresponding (matching) envelope template 310. The card template 300 has the following elements (components, features): A main greeting 301 is a text heading on a card's front face, indicating the primary subject or purpose of the card. A personal message 302 is text (sentence or phrase) following the greeting, which is typically user-selected. An image set 303 (one or more images 303A, 303B) is initially provided by the server and later substituted with images provided (uploaded) by the user. A non-text ornamentation 305 is exemplified by images of a candy cane 305A, gingerbread cookie 305B, candle 305C and flame 305D). Each card feature—including the card elements 301, 302, 303, 305 and the card's background—might have (be render with) any color from among a predefined set of colors.

The corresponding envelope 310 has the following elements (components, features). An address block 311 comprises a recipient name 312 (e.g., "Mr. and Mrs. Johnson") and a recipient address 313 (e.g., street address with city). A textual address preface 314 (e.g., "Deliver to") prefaces (introduces) the address. A non-text ornamentation 315 is exemplified by images of a candy cane 315A and gingerbread cookie 315B). Each envelope feature—including the envelope elements 312, 313, 314, 315 and the envelope's background—might have (be render with) any color from among a predefined set of colors.

In this example, the envelope 310 matches (corresponds to, is well suited for) the card 300 in several ways, as follows: The envelope 310 uses fonts that match those in the card 300. For example, the envelope's recipient name 312 has the same font as the card's greeting 301. The envelope's address preface 314 has the same font as a first font (in "Seasons Greetings from") in the card's message 302. The envelope's recipient address 312 has the same font as a second font (in "The Smith Family") in the card's message 302. The envelope's ornamental images 315A, 315B (candy and cookie) match ornamental images 305A, 305B in the card 300. The envelope 310 may have colors that match colors in the card 300. For example, the card's background color may be used for the name 312 or background of the envelope 310.

A postage stamp 316 is affixed to the envelope 310. In this example, the stamp 316 matches the card 300 and the envelope 310, in that the stamp 316 includes two ornamental images (candy and cookie) that are found in both the card 300 and the envelope 310.

Due to the above common features between the card 300, the envelope 310 and the stamp 316, all three items are associated with each other in the database 104. When designing the card template and envelope template, the designer might first design the card, and then design the envelope to match the card, and then select the stamp from among available postage stamps to match the envelope. The designer might alternatively perform this process in reverse order as follows: Each time a new postage stamp is issued by the post office, the designer might design an envelope to match the new stamp and then design a card to match the envelope.

For each card template 300, the data stored in the database 104 includes different stock features, where "stock" indicates not uploaded by the user. The stock features include stock text for the greeting 301, stock text for the message 302, one or more stock images for the image set 303, and different stock colors to use for the greeting, the message and the background.

For each envelope template 310, the data stored in the database 104 includes a name font for printing the name 312 on the envelope 310 and an address font for printing the address 313 on the envelope 310. The name font and address font may be standard fonts (e.g., Times or Arial) that are commonly available and not custom created (designed) for the particular envelope template. Alternatively, the name font and/or the address font may have been custom created and designated, by the designer of the envelope template, specifically for the respective envelope template. The name font and/or the address font might be ornate and calligraphic. The font and color of the name 312 may differ from the font and color of the address 313. For example, in the address block 311 in FIG. 3, the address font is a standard print style (e.g., Arial), whereas the name font is ornate and calligraphic with a letter flourish 317 (swooping line) projecting from one letter and extending under (but alternatively can extend over or through) one or more neighboring letters as though hand-crafted so that name becomes an ornamental design element.

For each envelope template 310, the data stored in the database 104 might specify the address preface 314. The address preface data might specify how each letter (character) of the preface text should be rendered and any image that accompanies (e.g., frames) the text. The address preface data might include one set of data specifying each text letter and a second set of data specifying a font for rendering the text letters. Or the address preface data might be in bitmap format, to be processed and printed as a picture.

For each envelope template 310, the data stored in the database 104 might include the stock image or images for the ornamental image set 315. The data might further include, for each envelope template 310, a color for each printed envelope element (name, address, preface, non-text ornamentation) and the envelope's background. The background color might be the color of the paper stock that the envelope was formed from.

For each envelope template 310, the data stored in the database 104 might include designations of dimensions (e.g., in inches) and one or more mood traits (e.g., warm, consoling, serene, funny, happy, sad, thoughtful, formal, informal, classical, modern, nature, western, cute, wildlife, childish).

The data might also include, for each envelope template and/or each card template, a postage stamp identifier that specifies a postage stamp (e.g., stamp 316 in FIG. 3), such as a paper-based adhesive-bearing postage stamp, that corresponds to (matches) the respective template.

The data might also include, for each card template and/or each envelope template, historical statistical popularity metrics regarding how often (how many times) the template was selected for purchase and/or selected for previewing. A metric for a card or envelope template might be a popularity ranking that ranks the template based on how often (how many times) the template was selected for purchase and/or selected for previewing. The "selected" criteria might be limited to selected for sale, or might include selected for preview. The metric might be in terms of a ranking (e.g., an envelope's percentile ranking relative to all envelopes) or in terms of how often an envelope was selected. Some popularity metrics for a given envelope might be measured relative to all envelope sales. Other popularity metrics for each envelope might be category-specific, in that the metric is relative to envelopes that are in a same category as the respective envelope, where "same category" might mean having same dimensions or same mood trait. Other popularity metrics for envelopes might be card-specific, by indicating how often each envelope was selected for use with a particular card. This might yield a surprising finding that, for use with a particular card, a certain envelope that was not designed for that card is selected by users more often than the envelope that was designed for that card.

Figure 4:
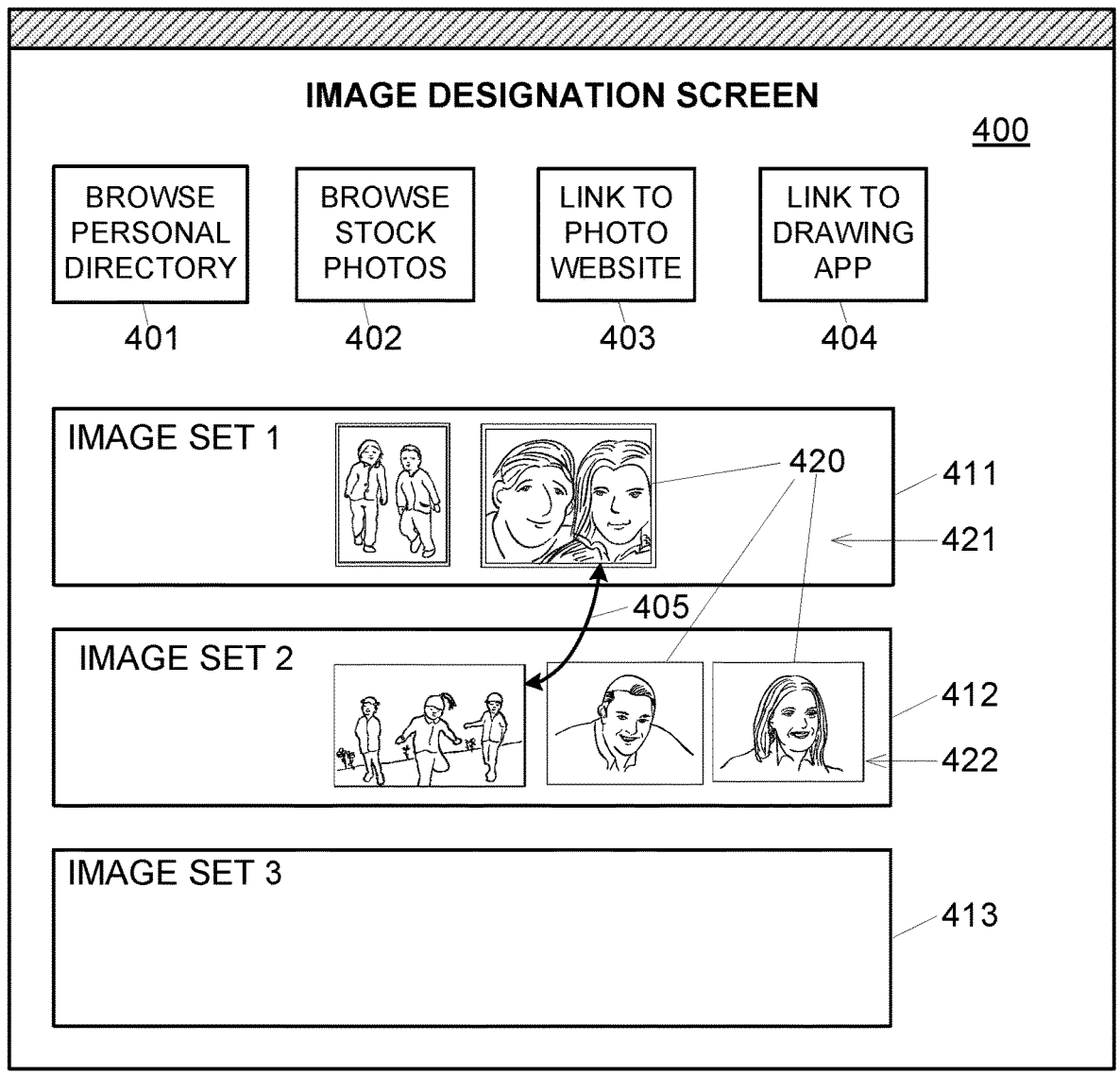
FIG. 4 is a screenshot of an example Image Designation Screen of the GUI, with which a user designates images (e.g., photos) to be inserted in the greeting card templates.

FIG. 4 shows an example Image Designation Screen 400 (window) of the GUI, with which a user designates images (e.g., photos) to be inserted in the greeting card templates (step 201 in FIG. 2). Clicking on a "Browse Personal Directory" icon 401 in the screen 400 accesses the user's computer directory, from which the user may select one or more images to upload (provide) to the website server 101. Clicking on a "Browse Stock Images" icon 402 causes the GUI to display a variety of stock images (e.g., photos) that are stored in the server's database 104, from which the user may select one or more stock images. Clicking on an external-website link 403 opens another website that has images, such as a website that holds the user's personal photographs, for the user to import images from the other website into the screen 400. Similarly, the other website may have a link to the Image Designation Screen 400 to export images from the other website to the Image Designation Screen 400. Clicking on an image application link 404 opens an image-containing and image-generating application on the user's own device, from which images can be imported. The user may also copy-and-paste images into the screen 400 from other websites or from other applications on the user device. The user may also drag-and-drop images into the screen 400 from other websites or other applications.

The images 420 that are imported into the Image Designation Screen 400 (in the various ways described above) together comprise "user-designated" images. The user may drag the user-designated images 420 to distribute them into one or more image set boxes 411, 412, 413 in the screen 400. In this example, the first image set box 411 contains a first image set 421, the second image set box 412 contains a second image set 422, and the third image set box 413 has not yet received any images from the user. In each designated image box 411, 412, 413, the user may also delete images, duplicate images, rearrange their order, and drag 405 them to another image set box.

Figure 5:
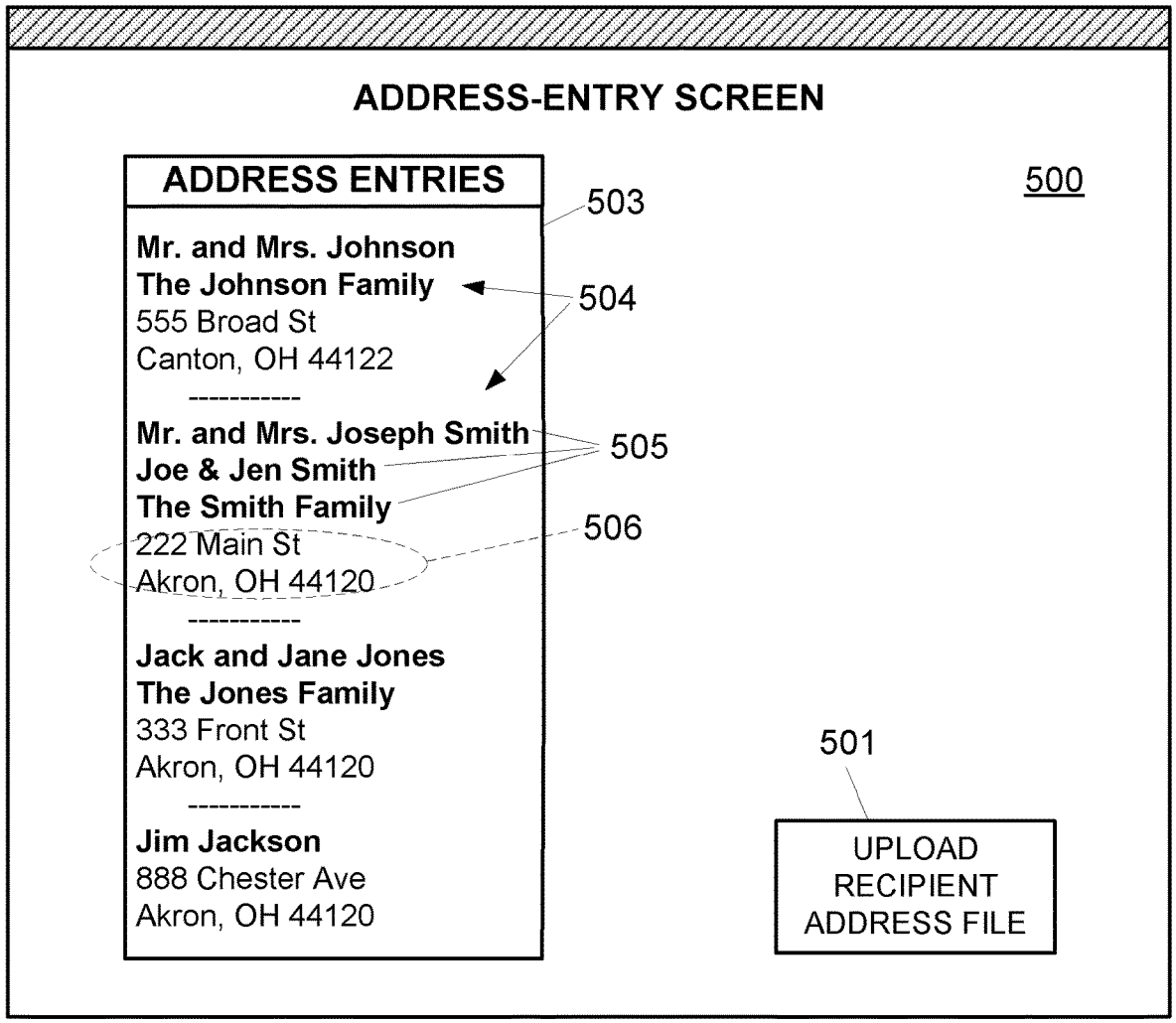
FIG. 5 is a screenshot of an example Address-Entry Screen of the GUI, with which the user enters addresses of intended recipients of a selected card.

FIG. 5 shows an example Address-Entry Screen 500 of the GUI, with which a user enters addresses of intended recipients of the card (step 202 in FIG. 2). Clicking on an "Upload Recipient-Address File" icon 501 opens a file directory browser window (not shown), from which the user selects a file (e.g., Word file or Excel file) that includes contact information for each intended recipient (contact, addressee). The selected file might be an address book file on the user device. The address file is uploaded, and the contact information is displayed on an Address Entries window 503. This window 503 displays an address entry 504 (recipient entry) for each recipient. The user can add, delete, edit (revise) and reorder (rearrange) the address entries in the Address Entries window 503.

Each uploaded (user-provided) address entry 504 (recipient entry) includes one or more alternative names 505 for the recipient, followed by the recipient's address 506 (e.g., including street, city and state). Alternative names 505 for the same address entry 504 might differ from each other in terms of formality and mood. For example, one address entry 504 (for a single recipient with a single street address) might include a formal name "Mr. and Mrs. Joseph Smith" and an informal name "Joe and Jen Smith" and family name "The Smith Family", with all three names listed on three consecutive lines and followed by the single street address 506.

Figure 6:
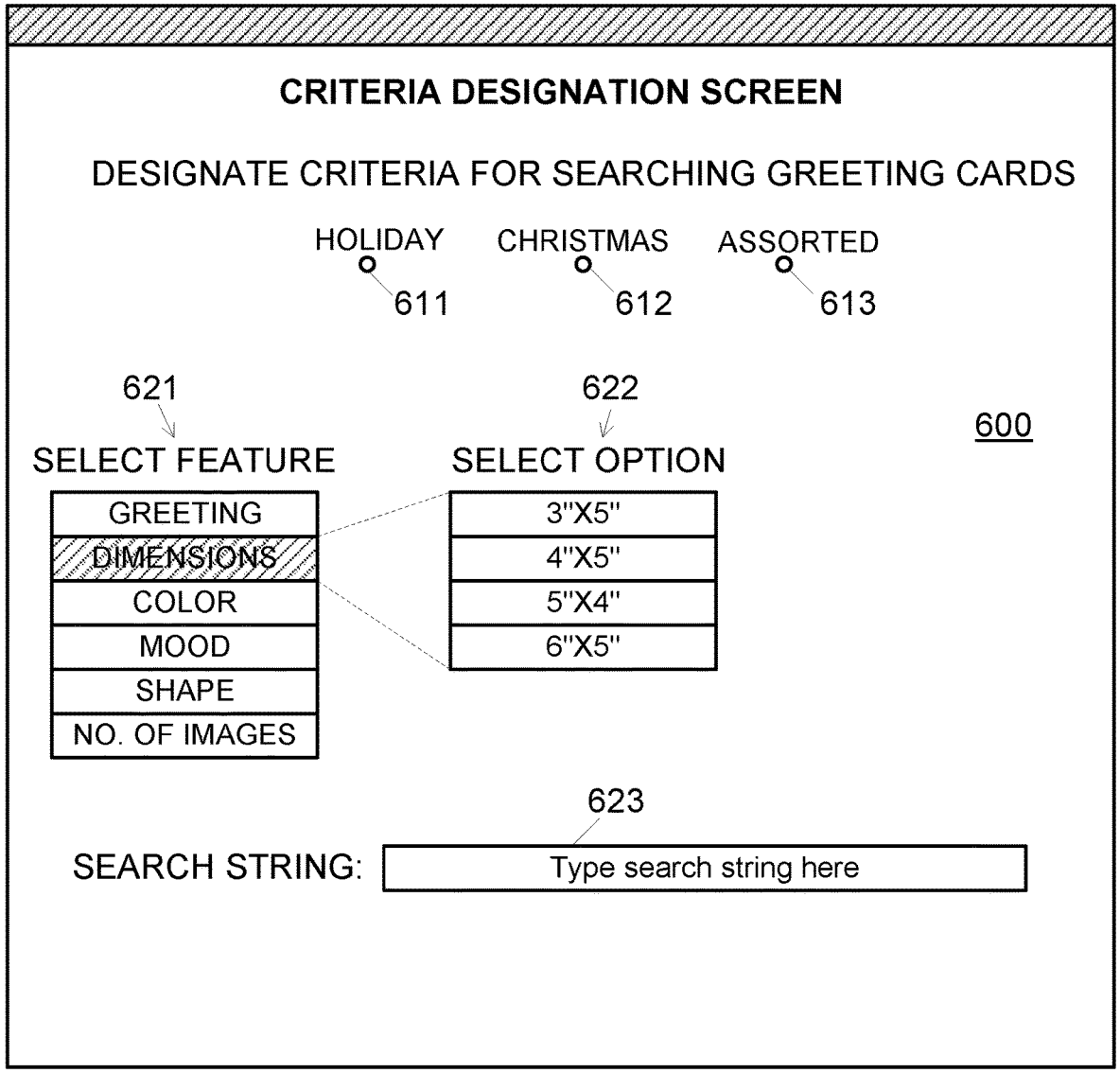
FIG. 6 is a screenshot of an example Criteria Designation Screen, with which the user designates search criteria for searching the database's card templates.

FIG. 6 shows an example Criteria Designation Screen 600, with which a user designates criteria that the system uses to search (including ranking and filtering) the database's card templates (step 203 in FIG. 2). The screen 600 displays virtual buttons 611, 612, 613, each assigned a different category name (Christmas, etc.), to be clicked on to select the respective category. Category names can, for example, specify a holiday (e.g., Christmas), life event (e.g., birthday), design style (e.g., classical or modern), mood (e.g., funny, thoughtful), text font, card color, card-structure (e.g., single-fold, foil laminated) or card dimensions (height and width).

The Criteria Designation Screen 600 may include a dropdown feature-selection menu 621 displaying a list of card features (e.g., greeting, dimensions, color, mood, peripheral shape, number of images, font, structure and style). When the user selects one of the features, a "Select Option" dropdown menu 622 displays a list of category options relating to the selected feature, for the user to choose from. For example, selecting the "Greeting" feature might yield the options "Merry Christmas", "Happy Birthday" and "Type your greeting here". Selecting a "Message" feature might yield different suggested messages, along with "Type your message here". Selecting a "Color" feature might yield different suggested colors, or color combinations (e.g., "red & green") or a non-color term (e.g., "American flag" or "Christmas") that is associated with colors for the card to have (such as red, white and blue for flag, and green and red for Christmas).

The Criteria Designation Screen 600 also displays a "Search String" field 623 for typing a search string. The search string may be, for example, a server-designated category like the categories listed above. Or the search string may be a term that is not a category, such as a greeting phrase to be compared to the stock greetings. Or the search string may be a key word to be compared to key words (such as mood) assigned in the database to each template.

The server 101 (FIG. 1) searches the card templates in its database 104 for templates that match the user-designated search criteria by ranking the templates for closeness of match (step 204 in FIG. 2). The server then filters (narrows) the full database of templates down to a displayable number, in this example four, of card templates that best match the user's criteria.

Figure 7:
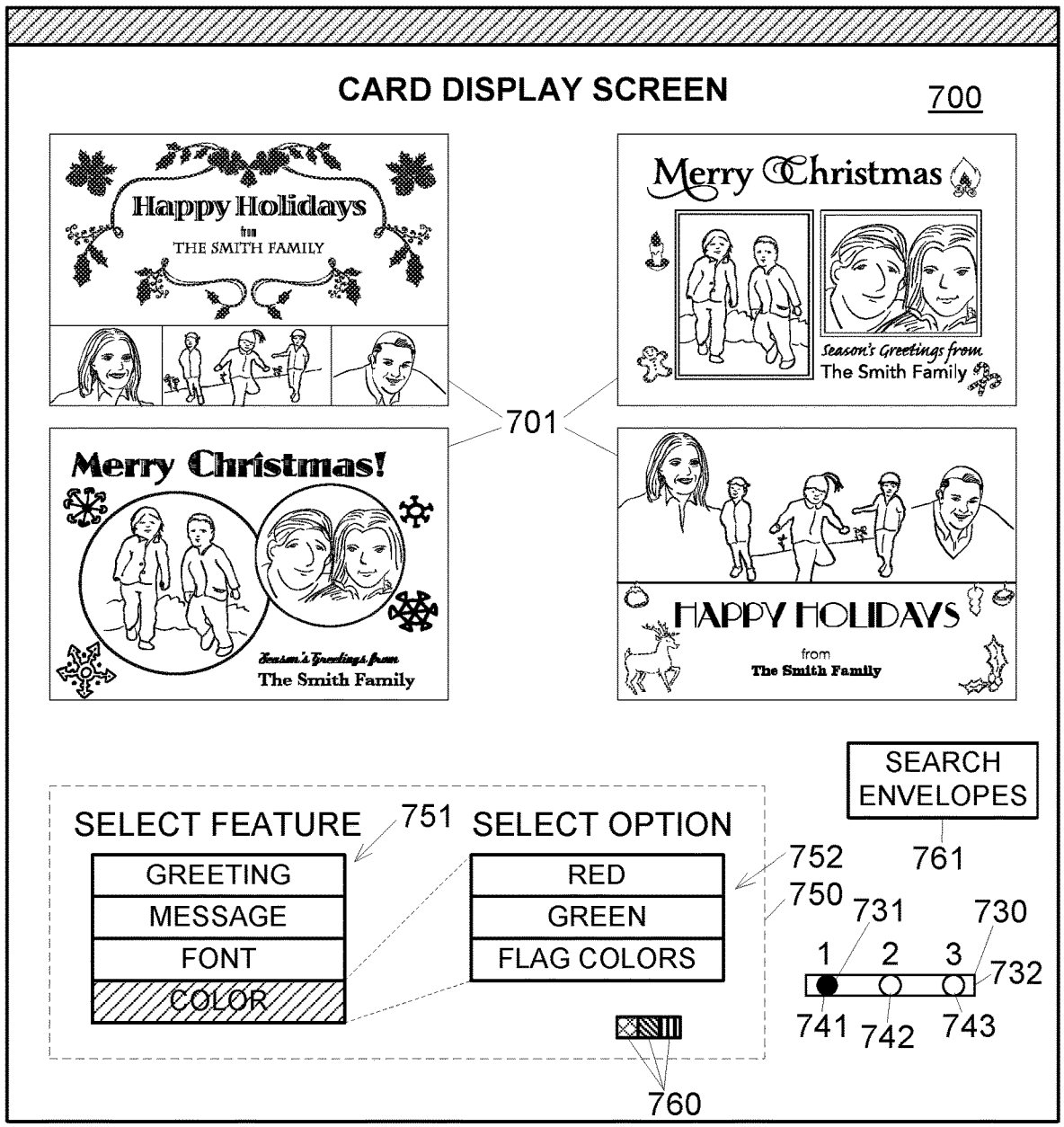
FIG. 7 is a screenshot of an example Card Display Screen with which the user views, selects, manipulates and modifies the card templates.

FIG. 7 shows an example Card Display Screen 700 with which the user can view, select, manipulate and modify the best-matching (highest-ranking) candidate card templates. This screen 700 first displays (step 205 in FIG. 2) the four templates 701 that were found in the search step. The templates 701 are positioned in an array, which in this example has two rows and two columns. Each card template 701 is displayed along with its stock images, of which there may be zero, one or more stock images. Since each template may be assigned multiple alternative feature options (e.g., different stock greetings, stock messages and stock colors), the server selects the stock feature for each template that best matches the search criteria.

This Card Display Screen 700 includes an Image Selector 730, to be actuated with the input device 114 (FIG. 1) for transforming the images sets 303 (FIG. 3) in the card templates. In this example, the selector 730 includes a virtual slider button 731 that can be grabbed with the mouse or finger (if touch screen) and slid along a horizontal virtual track 732. The selector 730 has a finite number of button positions that equals the total number of available image sets (in this case two: 421 and 422 in FIG. 4) plus the stock image set that the cards 701 are initially displayed with. So, in this example, the selector 730 has three positions 741, 742, 743. The button 731 is initially in a fully left "first" position 741 ("1") when the image set in each card is the respective stock image set. Movement of the button 731 in a "forward" (rightward) direction to a "second" position 742 ("2") causes the images in each card 701 to undergo a first forward transformation (transition) to the first user-designated image set 421 (FIG. 4). Movement of the button 731 further "forward" (rightward) to a "third" position 743 ("3") causes the images in each card 701 to undergo a second forward transformation to the second user-designated image set 422 (FIG. 4). If a card 701 has more image spaces to fill than there are user-designated images in the respective image set, remaining spaces in the card will be left blank instead of retaining their stock images.

Movement of the slider button 731 in a reverse (leftward) direction from the "3" position to the "2" position causes the second user-designated image set 422 in each card 701 to undergo a reverse transformation to be replaced with the first user-designated image set 421. Further movement of the slider button 731 in the reverse direction to the "1" position causes the first user-designated image set 421 in each card 701 to be replaced by the initial stock images.

Operation of this selector 730 provides user control of the transformation process, which is amusing to the user and gives the user the impression of being in control of the design customization. Operation of this selector 730 also helps the user appreciate how well his/her designated image set 421 goes with each card 701. It also facilitates a comparison of how well a user-designated image 421 goes with each card 701 relative to the stock image that the card designer considered optimal for that card. It also facilitates comparison of how well one user-designated image set 421 goes with each card 701 relative to another user-designated image set 422 that the user him/herself previously considered optimal for that card.

While the cards 701 are displayed, the user can apply changes to all cards 701 using a feature-modification section 750 of the screen 700 as follows: The user can open a dropdown feature-selection window 751 displaying a list of features (e.g., greeting, message, font, color). When the user selects one of the features, a feature-options dropdown menu 752 displays a list of options relating to the selected feature for the user to choose from. For example, if the user selects the "Greeting" feature, the option list might be "Merry Christmas", "Thank You", "Happy Birthday" and "Type your greeting here". When an option is selected, such as the user typing a greeting in the "Type your greeting here" option, each card's greeting changes to the selected greeting for all displayed cards 701 simultaneously. If the user selects the "Color" feature, the option list 752 may be, for example, "Red", "Green" and "Type a color here". Or, the GUI may display a color wheel from which the user can select a color. The color selection may affect color or color tint of background or text or image, in either a user image or stock image for all cards simultaneously. The "Options" menu 752 for the "Color" feature might also include a non-color term (e.g., "American flag" or "Christmas") that is associated with colors for the card to have (such as red, white and blue for flag, and green and red for Christmas).

The feature modification section 750 may include a color selector comprising squares 760 of different colors. Selecting (e.g., clicking or touching) a square applies that square's color to all displayed cards 701.

Before or after image transformations and feature changes have been performed, the user may drag the cards 701 to rearrange them on the array, which changes the positions of the cards 701 in the array. The user may also successively delete (eliminate) cards 701 from the array until one last card is left. And even that one last card may be modified by the user using the same image transformations and feature changes explained above for the initial set and subset.

The user can select a card for purchase from the array of candidate cards by picking (such as by double-clicking) the desired card. Alternatively, the server might consider the last card template remaining on the display as the user-selected card.

Clicking on a "Search Envelopes" icon 761 prompts the server 101 (FIG. 1) to search and rank the envelope templates in its database 102 based on different considerations (step 206 in FIG. 2).

One consideration in the envelope search is whether an envelope template is paired in the database to the selected card.

Another consideration in the envelope search is based on the historical statistical data (described above) stored in the database. Some considerations might assign higher ranking to envelopes with higher popularity metrics. Other considerations might assign higher ranking to envelopes whose mood traits (described above) better match the mood traits of the selected card template.

Another consideration in the envelope search is based on the uploaded contact list. For example, the server 101 may determine that one or more name names in the list are too long for optimum fitting in some envelope templates because, for example, the name would extend into, or too close to, ornamentation 315 (FIG. 2) of the envelope. Conversely, the server may determine that the names in the list tend to be shorter than expected for a particular envelope template and would therefore better suit an envelope template that leaves less room for addresses and/or looks best with shorter addresses.

The server 101 might also decipher and analyze the recipient names to determine a mood (trait, character) implied by the names, and give higher ranking to envelope templates that more closely match that mood. For example, the server might give a higher ranking to formal envelope designs if the address names include formal titles, such as "Mr. and Mrs." and "Dr.". Conversely, the server might give a higher ranking to informal envelope designs if the address names tend to omit titles, such as "Joseph and Elizabeth Smith". The server might give a higher ranking to very informal envelope designs if the address names tend to include nicknames, such as "Joe and Jen".

The server might also decipher and analyze the recipients' addresses, to determine a mood based on geographic region. For example, different moods might be assigned to Alaska, Hawaii, Montana, New York and France. The mood that the server derives from the addresses may be compared to the moods assigned in the database to candidate envelope templates.

The envelope search concludes with ranking the envelopes in the database based on various considerations, including the considerations mentioned above. The server then filters (narrows) the envelope templates down to a displayable number, in this example four, of the highest ranking envelope templates.

Figure 8:
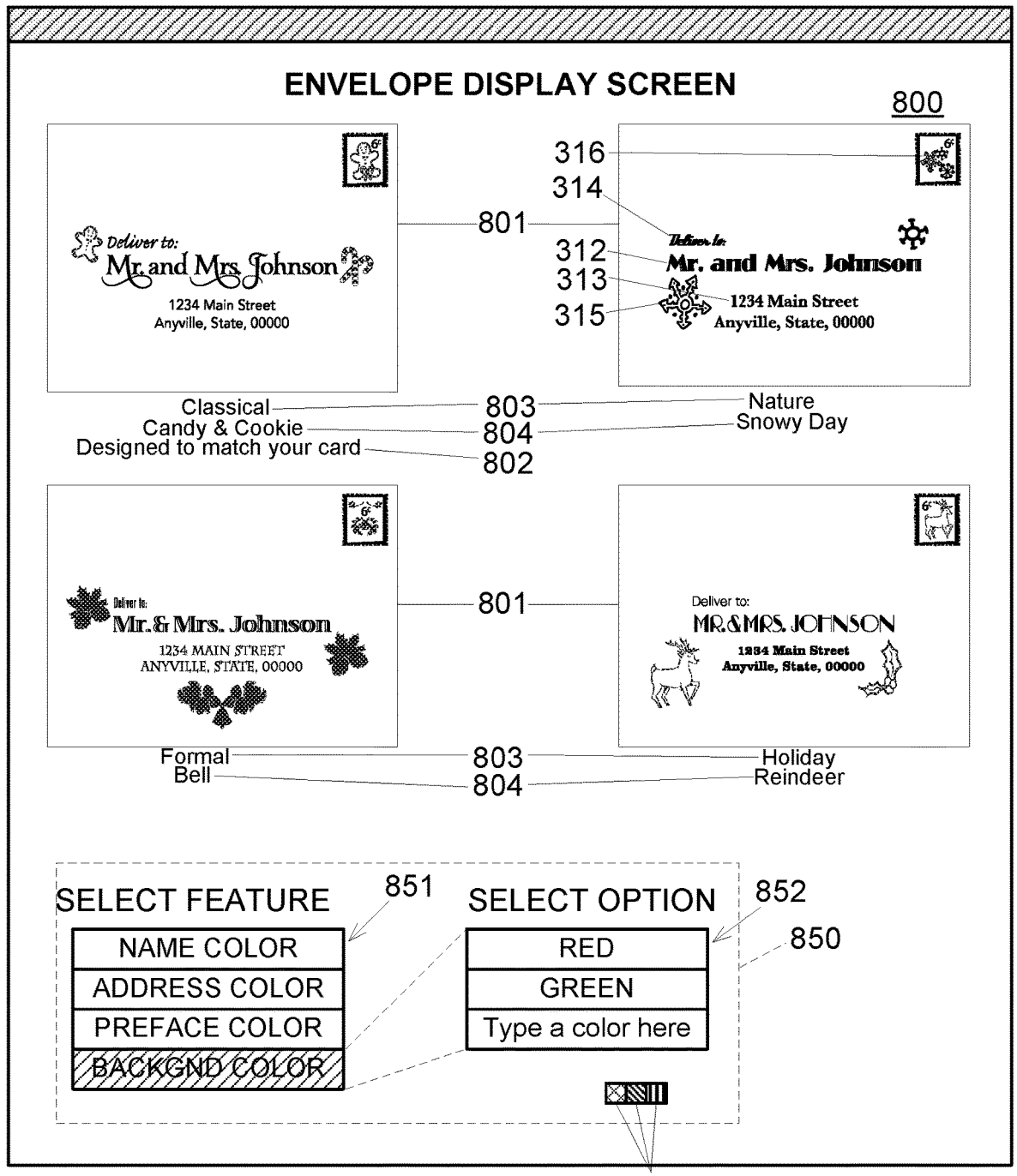
FIG. 8 is a screenshot of an example Envelope Display Screen with which the user views, selects, manipulates and modifies the envelope templates.

FIG. 8 shows an example Envelope Display Screen 800 with which the user can view, select, manipulate and modify the highest-ranking envelope templates (step 207 in FIG. 2). This screen 800 initially displays the highest-ranking (best-matching) envelopes 801 that were found in the search. The envelopes are positioned on the screen based on ranking, with the highest ranking envelope on the top left, and successively-lower ranking envelopes appearing successively to the right and/or in lower rows. The highest-ranking envelope template might be the envelope template that the database indicates corresponds to the selected card template. The GUI might include an indication 802 of which of the envelopes corresponds to the user-select card. An example of the indication is a text message "Designed to match your card" printed near (under) the matching envelope. The GUI might further include, near (under) each displayed envelope including the matching envelope, a brief explanation 803 of the envelope template's character trait (e.g., classical, formal, nature) to help advise the user on where the envelope is most appropriate. The GUI might further include, near (under) each displayed envelope including the matching envelope, a unique name 804 (identifying name) assigned to the template design so that the user can record the name and refer to it later. Each envelope is displayed with its features: name 312 and address 313 of the name block 311, address preface 314, non-text ornamentation 315 and stamp 316.

In preparation for first displaying each envelope 801 on the display screen 800, the colors of the envelope features (name, address, preface and non-text ornamentation) may be selected by the server to best match the user-selected colors of the user-selected card. For example, the recipient's name 312 on the envelope 801 might be automatically given the same color as the greeting 301 (FIG. 3) of the selected card. The envelope's background color might match the selected card's background color. The address preface 313 (e.g., "Deliver To") might be given the same color as the message 302 (FIG. 3) in the selected card. The recipient's name 312 and address 313 might be the same for all displayed envelopes 801, and might be a stock name and address or might be the name and address of one of the listed recipients 504 (FIG. 5) (such as the first listed recipient). The server's selection of envelope colors to match the card colors can result in the server selecting an envelope color to match a color that was user-selected for the card despite the user not having had the envelope in mind when selecting the color for the card. For example, the envelope's preface 313 may be assigned the color that the user selected for the card's background.

The image of the stamp 316, shown on each envelope 801 in the Envelope Display Screen 800, might be the stamp corresponding in the database 104 to the selected card or may be the stamp corresponding in the database 104 to the respective displayed envelope 801.

While the envelopes 801 are displayed, the user can apply changes to all envelopes 801 simultaneously using a feature-modification section 850 of the Envelope Display Screen 800 as follows: The user can open a dropdown feature-selection window 851 displaying a list of features (e.g., name color, preface color, background color). When the user selects one of the features, a feature-options dropdown menu 852 displays a list of options relating to the selected feature for the user to choose from. For example, if the user selects the "Name" feature, the option list 852 might be "Red", "Green" and "Type a color here". When an option is selected (such as selecting "Red" color for the "Name" feature), that feature changes in all the displayed envelopes 801 simultaneously (in this example resulting in the recipient names in all envelopes changing to red). So, for example, if the name in a displayed envelope was displayed with a first color, user-selection of a second color of "Red" will cause the name to be displayed in red in place of the first color.

The feature modification section 850 may include a color selector comprising squares 860 of different colors. Selecting a square 860 changes each envelope's background color (e.g., paper stock color) to the color of the selected square 860.

Before or after the envelope feature changes have been performed, the user may drag the envelopes 801 to rearrange them on the array, which changes the positions of the envelopes 801 in the array. The user may also successively delete (eliminate) envelopes 801 from the array until one last envelope is left. And even that one last envelope may be modified by the user using the same image transformations and feature changes explained above for the initial set and subset.

The user can select an envelope for purchase by selecting (e.g., clicking on) the desired envelope from the array. Alternatively, the server might consider a last envelope template remaining on the display as the user-selected envelope.

The user might select an envelope template that leaves insufficient room for one or some of the name or addresses. For example, some names or addresses might get too near to, or even overlap, an image on the envelope. In such a situation, the GUI might display an oversized-text warning (notification) of this fact to the user. The warning might state "Some lines of text on your address list might overlap ornamental images of the selected envelope." This gives the user a chance to select another envelope template. The name-length warning might specify which name or names or address or addresses are too long, thereby giving the user a chance to revise the names or addresses to fit.

Figure 9:
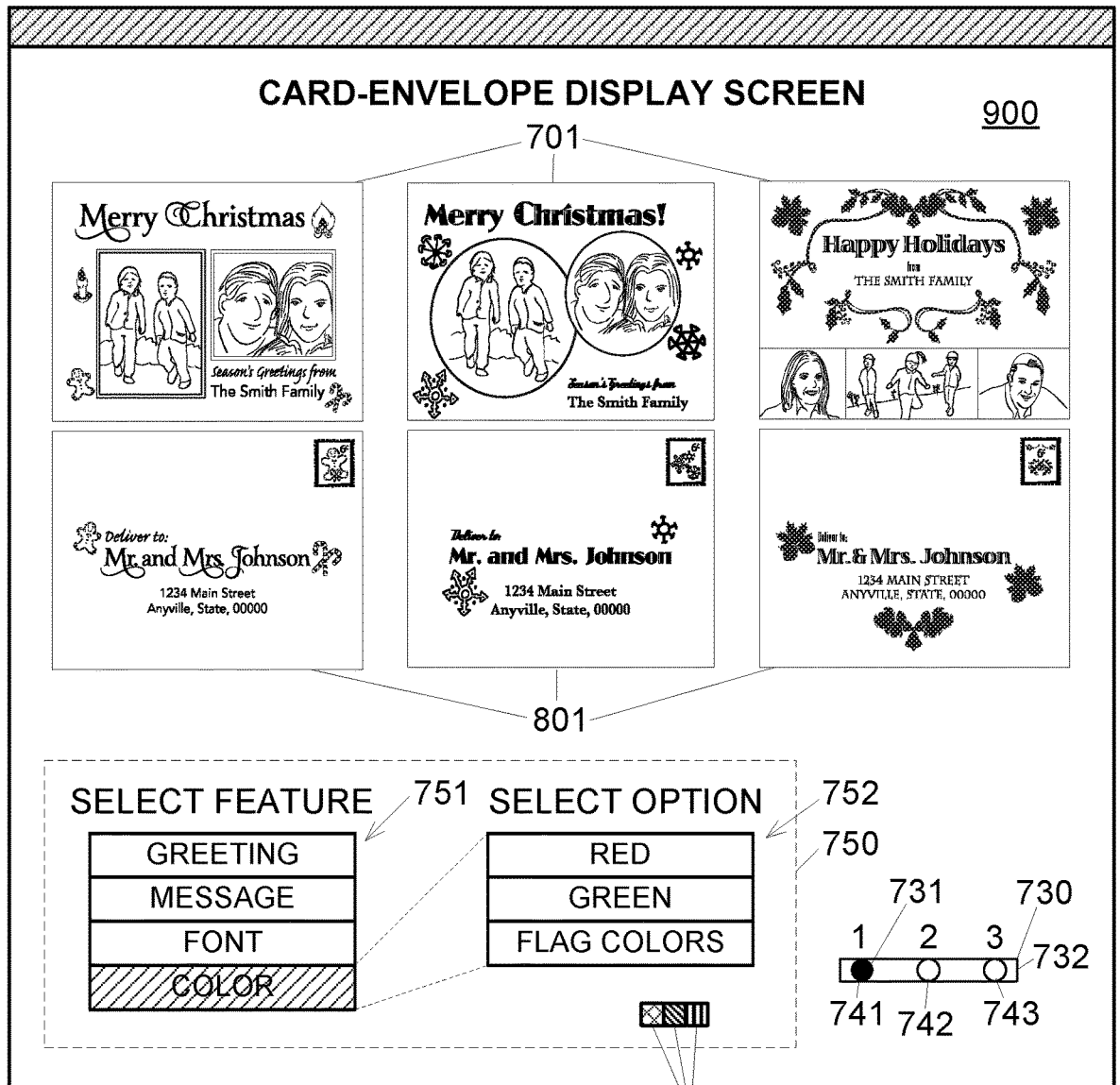
FIG. 9 is an screenshot of an example Card-Envelope Display Screen, with which the user views, selects, manipulates and modifies the highest-ranking card templates and their matching envelope templates.

FIG. 9 shows a Card-Envelope Display Screen 900 of the GUI, with which the user can view, select, manipulate and modify the highest-ranking card templates and their matching envelope templates (step 207 in FIG. 2). This screen 900 displays each highest-ranking card template 701 along with its matching envelope template 801. This screen 900 may be presented in place of the Card Display Screen 700 (FIG. 7)

and/or in place of the Envelope Display Screen 800 (FIG. 8). This screen 900 offers the advantage of providing more information about each displayed card—by showing the matching envelope—than the Card Display Screen 800 (of FIG. 8). But this screen 900 has the disadvantage that room taken up by the envelopes leaves less room for displaying cards. This screen 900 might enable revising and manipulating each card as does the Card Display Screen 700 (FIG. 7), using the feature-modification tools 750, 751, 752, 730, 731, 741, 742, 743 and 760 available in the Card Display Screen 700 (FIG. 7). The Screen 900 might include additional tools (not shown) for modifying features of the envelopes too. After the user selects one of the displayed card/envelope pairs, the Envelope Display Screen 800 (FIG. 8) might be opened. Screen 800 would enable the user to view other envelopes, alongside the matching envelope, that the user might prefer over the matching envelope. Screen 800 would also enable the user to modify and manipulate the envelopes and select the final envelope.

Figure 10:
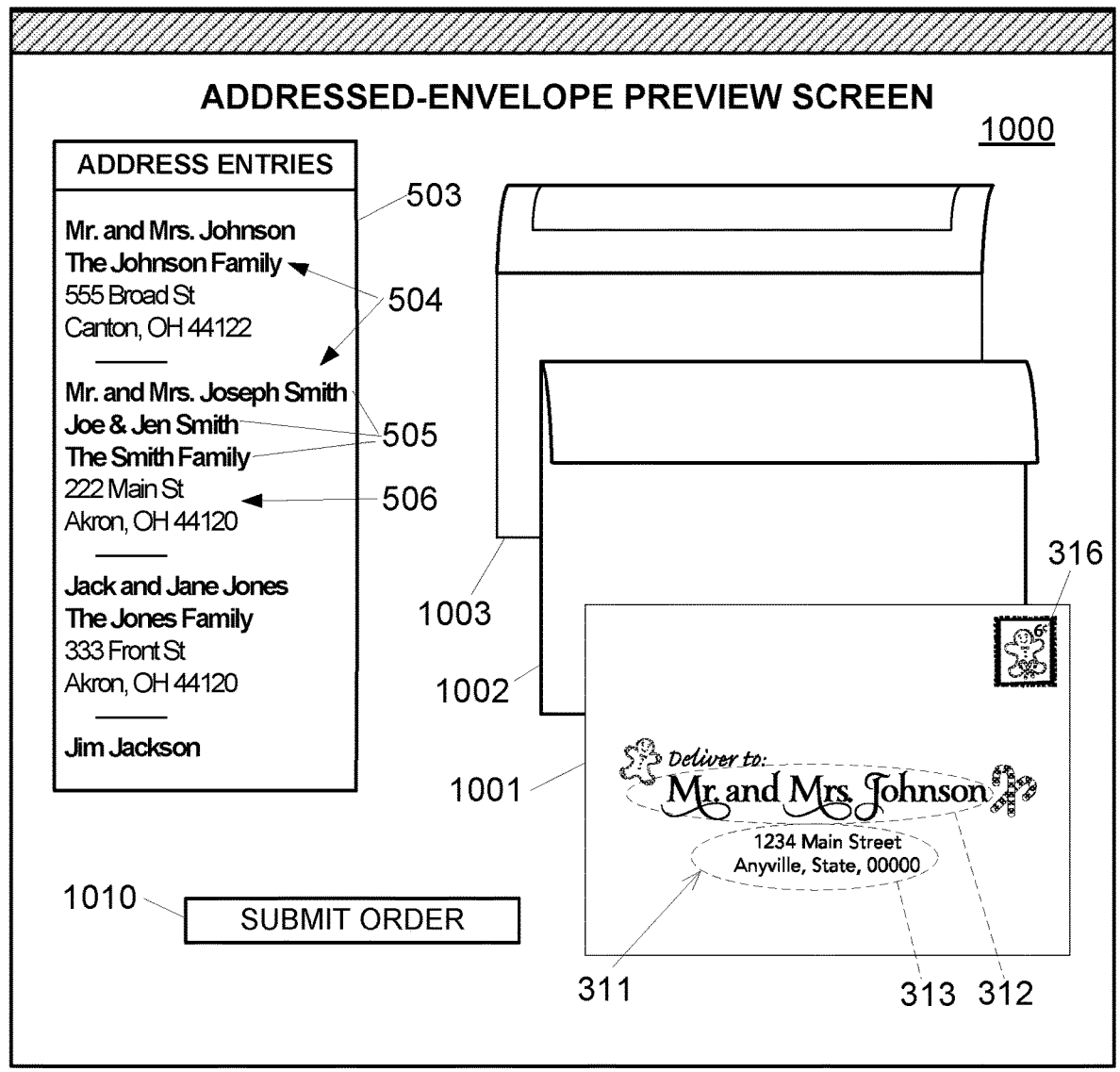
FIG. 10 shows a screenshot of an example Addressed-Envelope Preview Screen 800.

FIG. 10 shows an example Addressed-Envelope Preview Screen 1000 for previewing the addressed envelopes (step 208 in FIG. 2). This screen 1000 includes an Address Entries window 503 (like that of FIG. 5). The Address Entries window 503 displays a scrollable list of the uploaded recipient address entries 504. Each entry 504 includes at least one recipient name 505 and a recipient address 506. Each time the user selects (e.g., clicks on) one of the entries 504, the Preview Window 1000 displays a preview 1060 (image) of an envelope, with the selected recipient's address block 311 (comprising name and address) and the (the database-designated) matching postage stamp 316. The preview includes a front view 1001, a closed-flap rear view 1001 and an opened-flap rear view 1002 of the envelope. This screen 1000 preview shows how the actual envelope will appear to the recipient when the card arrives in the mail.

In preparation for each preview, the server might determine that recipient's name 312 or address 313 will overlap a design feature of the envelope. The server might respond in any of the following ways: (1) letting the overlap occur; (2) displaying a oversize-text notification (e.g., stating "Text might overlap images") next to an oversized name 505 or oversized address 506 in the list 503, to enable the user to change the name 505 or address 506 to avoid the overlap; (3) narrowing the text of the oversized name 505 or oversized address 506 by using a smaller font size or a condensed version of the same font size; (4) adjusting the location of the address block 311 on the envelope 1001 to avoid the overlap (such as moving the address block 311 leftward to avoid an overlap at the right of the address block or moving it rightward to avoid an overlap at the left or downward to avoid an overlap at the top or upward to avoid an overlap at the bottom); (5) splitting a line of text of the name 311 or address 312 into two lines (such as by printing "The Ferguson" on a top line and "Family" on the next line, or by printing "100 Superior Ave" on one line and "Suite 300" on the next line); (6) select a shorter name from among the recipient's multiple alternative names 355 (if the recipient entry includes multiple alternative names 355); (7) replacing terms (words) in the name or address with their abbreviations, such as by changing "and" to "&", "Street" to "St", "Suite" to "Ste" or "#", and "New York" to "NY". The server might be programmed with the ability to implement any of the above seven approaches. The server might be further programmed to determine, for the individual recipient entry at hand, which approach to follow. This might result in different ones of the above seven approaches being applied to different recipients within the same uploaded recipient list.

If a single recipient entry has multiple alternative names, the server might decipher and analyze the alternative names to determine which one is most appropriate for the type of card. For example, if one recipient entry has the three names "Mr. and Mrs. Joseph Smith", "Joseph and Jennifer Smith" and "The Smith Family", the server might select the formal "Mr. and Mrs. Joseph Smith" if the card is a wedding invitation, and might select a less formal "Joseph and Jennifer Smith" for a baby shower invitation, and might select the family name "The Smith Family" for a Christmas card.

The user selects (e.g., clicks on) a "Submit Order" icon 1010 to purchase the selected card and envelopes.

Figure 11:
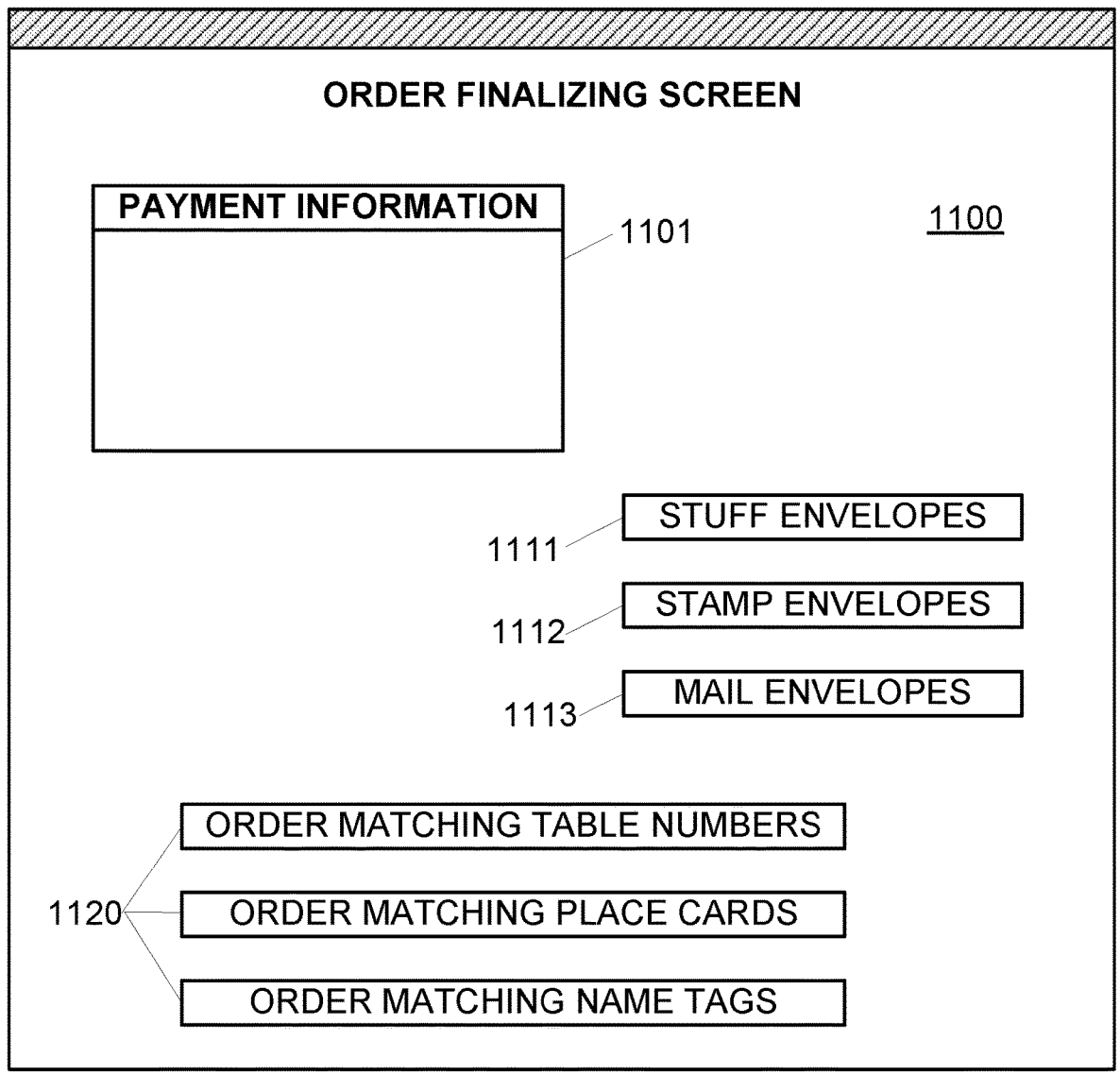
FIG. 11 shows an Order Finalizing Screen with which the user enters information for completing the order.

FIG. 11 shows an Order Finalizing (Completion) Screen 1100 with which the user enters information for completing the order. This screen 1100 has a Payment Information window 1101 through which the user provides payment (credit card) information. The screen 1100 has different icons through which the user selects different options for preparing and delivering the cards and envelopes. A Stuff Envelope option (icon 1111) is for the vendor to stuff each envelope with the purchased card. An Stamped Envelopes option (icon 1112) is for the vendor to stamp each envelope with the matching stamp that appeared on the GUI preview (FIG. 10). A Mail option (icon 1113) is for the vendor to stuff each envelope (per the first option), stamp each envelope (per the second option) and mail each envelope to the respective recipient.

The Order Finalizing Screen 1100 includes icons 1120 that can be selected (e.g., clicked) for ordering items that are related to (match) the selected cards and imprinted with a design (motif) that matches a design (motif) of the selected. If the cards are wedding invitations, an ancillary item might be a set of table number cards to be placed on tables at a wedding. Other ancillary items are place cards and name tags. Each place card and each name tag is imprinted with a corresponding name from the uploaded recipient list. Each name is printed on the place card and name tag with the same font as the name was printed on the envelope, and along with the ornamentation 315 that was included in the selected envelope. Other ancillary items include holiday photo cards, wedding invitations, wedding-save-the-date cards, birth announcements, escort cards, table-number cards, and personalized wedding invitations. The cards and envelopes that have been user-selected and user-modified in one session can be stored for reference when imprinting ancillary items that are ordered in a later session months later.

After the order is completed, a print facility of the vendor prints the cards (step 209 in FIG. 2) in one printing process step, by printing all of the card features (greeting 301, message 302, user-provided image set 303 and ornamentation 305) on blank paper stock. This is in contrast to printing the cards in two printing process steps—which would be by first printing only non-user-specified card features on blank card stock in a first printing step, then inventorying the cards, and then printing user-specified features in a second printing step. Each card is printed to match the appearance of the finalized (selected-and-modified) card template as displayed on the GUI screens (FIGS. 7 and 9).

The print facility also prints the envelopes, by printing all of the envelope features (address block 311, address preface 314 and non-text ornamentation 315) in one printing process step on blank envelope stock. This is in contrast to printing the envelopes in two printing process steps—which would be by first printing the non-user-specified features (314, 315) on blank envelope stock in a first printing step, then inventorying the envelopes, and then printing the address block 311 in a second printing step. The envelope is printed to match the appearance of the finalized (selected and-modified) envelope template as displayed on the GUI screens (FIGS. 8-10).

If the Stuff Envelope option 1111 was selected, then the vendor's print facility stuffs each purchased envelope with one of the purchased cards.

If the Stamped Envelopes option 1112 was selected, then the print facility stamps each envelope with the matching stamp. This can be done by affixing (adhering) the matching paper stamp on each envelope. Or by imprinting (with ink) the envelope with the matching stamp.

If the Mail option 1113 was selected, then the print facility (i) stuffs the envelopes with the selected card, (ii) stamps the envelopes with the matching stamp, and (iii) mails the stuffed-and-stamped envelopes to the recipients.

If none of the options 1111, 1112, 1113 (FIG. 11) was selected, then the vendor ships (delivers) the cards and envelopes to the user. The user must then insert (stuff) each card into an envelope, affix (adhere) a postage stamp to the envelope, and drop off the stuffed-and-stamped envelopes at a post office for delivery to the recipients.

When preparing the paper envelopes, the server can convert the address blocks into a pre-press PDF file and then print the custom file on the envelopes. These envelopes might accompany stationery products such as holiday photo cards, birth announcements and other customizable cards that customers might send out via mail to recipients. Customers might choose from a range of envelope design options online and leverage the merchant's capability to dynamically insert their personal data into their selected design template. The server might automatically generate a customized file that is print onto the envelopes. A web-to-print system applies the customer's selections to a design template using custom scripts and actions that manipulate Adobe Illustrator to generate a multi-page PDF for print. This PDF is sent to the printing facility using XML and then printed onto envelopes and sent to the customer.

The components and procedures described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by an alternative substantially equivalent term enclosed in parentheses.

The invention claimed is:

1. A method for manufacturing envelopes, the method comprising:
    storing, in a database, different card templates, wherein each of the different card templates has a card feature that is associated with a set of colors;
    storing, in the database, different envelope templates, wherein each different envelope template is associated with a format of a physical envelope and has at least one envelope feature;
    receiving, by a server through a graphical user interface (GUI) on a user computing device, a user selection of a selected card template from among the different card templates;
    receiving, by the server through the GUI on the user computing device, a user selection of a color from the set of colors to be applied to the card feature of the selected card template;
    displaying, by the GUI on the user computing device, the selected card template;
    rendering, by the server through the GUI on the user computing device, the card feature of the displayed card template with the color;
    displaying, by the GUI on the user computing device, one or more of the different envelope templates stored in the database;
    receiving, by the server through the GUI on the user computing device, a user selection of a selected envelope template from among the one or more different envelope templates, wherein the selected envelope template includes non-text ornamentation;
    displaying, by the GUI on the user computing device, the selected envelope template, wherein the selected envelope template includes an address block;
    receiving, by the server through the GUI on the user computing device, a user-provided recipient name and a corresponding user-provided recipient address for inclusion in the address block;
    determining, by the server, a potential overlap between the non-text ornamentation and the address block including the user-provided recipient name and the corresponding user-provided recipient address;
    in response to determining the potential overlap:
        displaying, by the GUI on the user computing device, an error message alerting the user of the potential overlap, and
        displaying, by the GUI on the user-computing device, an option for the user to revise the user-provided recipient name and the corresponding user-provided recipient address to avoid the potential overlap,
    receiving, by the server through the GUI on the user computing device, a user selection of a card and an envelope that respectively match the selected card template and the selected envelope template; and
    generating, by the server, print file data for printing the envelope (i) with the user-selected envelope template and (ii) with the address block that includes the user-provided recipient name and the user-provided recipient address.

2. The method of claim 1, further comprising:
    storing, in the database, for each envelope template, a stamp identifier that specifies a postage stamp that corresponds to the respective envelope template;
    printing the address block on an envelope corresponding to the selected envelope template; and
    affixing the corresponding stamp to the envelope.

3. The method of claim 1, further comprising:
    receiving, by the server through the GUI on the user computing device, a user selection of a font style to be applied to the card feature of the selected card template; and
    rendering, by the server through the GUI on the user computing device, on the selected envelope template, the envelope feature of the selected envelope template with the font style that was user-selected for the card feature;
    wherein the generated print file data for printing the envelope further includes the envelope feature having the font style that was user-selected for the card feature.

4. The method of claim 1, wherein,
    the selected card template includes a font style, and the generated print file data for printing the envelope further includes the envelope feature having the font style included in the selected card template.

5. A system for manufacturing envelopes, comprising:
a hardware database that stores:
different card templates, wherein each of the card templates has a card feature that is associated with a set of colors, and
different envelope templates, wherein each stored envelope template is associated with a format of a physical envelope and has at least one envelope feature;
a hardware server configured to:
receive, through a graphical user interface (GUI) on a user computing device, a user selection of a selected card template from among the different card templates;
receive, through the GUI on the user computing device, a user selection of a color from the set of colors to be applied to the card feature of the selected card template;
display, by the GUI on the user computing device, the selected card template;
render, through the GUI on the user computing device, the card feature of the displayed card template with the color;
display, by the GUI on the user computing device, one or more of the different envelope templates stored in the database;
receive, through the GUI on the user computing device, a user selection of a selected envelope template from among the one or more different envelope templates, wherein the selected envelope template includes non-text ornamentation;
display, by the GUI on the user computing device, the selected envelope template, wherein the selected envelope template includes an address block;
receive, through the GUI on the user computing device, a user-provided recipient name and a corresponding user-provided recipient address for inclusion in the address block;
determine a potential overlap between the non-text ornamentation and the address block including the user-provided recipient name and the corresponding user-provided recipient address;
in response to determining the potential overlap:
display, by the GUI on the user computing device, an error message alerting the user of the potential overlap, and
display, by the GUI on the user-computing device, an option for the user to revise the user-provided recipient name and the corresponding user-provided recipient address to avoid the potential overlap,
receive, through the GUI on the user computing device, a user selection of a card and an envelope that respectively match the selected card template and the selected envelope template; and
generate print file data for printing the envelope (i) with the user-selected envelope template and (ii) with the address block that includes the user-provided recipient name and the user-provided recipient address.

6. The system of claim 5, wherein:
the hardware database stores, for each envelope template, a stamp identifier that specifies a postage stamp that corresponds to the respective envelope template; and
the hardware server is further configured to cause the address block to be printed on an envelope corresponding to the selected envelope template, and the corresponding stamp to be affixed to the envelope.

7. The system of claim 5, wherein the hardware server is further configured to:
receive, through the GUI on the user computing device, a user selection of a font style to be applied to the card feature of the selected card template; and
render, through the GUI on the user computing device, on the selected envelope template, the envelope feature of the selected envelope template with the font style that was user-selected for the card feature;
wherein the generated print file data for printing the envelope further includes the envelope feature having the font style that was user-selected for the card feature.

8. The system of claim 5, wherein, the selected card template includes a font style, and
the generated print file data for printing the envelope further includes the envelope feature having the font style included in the selected card template.

* * * * *